United States Patent
Auernhammer

(10) Patent No.: US 8,269,381 B2
(45) Date of Patent: Sep. 18, 2012

(54) MAGNET APPARATUS OF AN ELECTRICAL MACHINE WITH A COOLANT LINE

(75) Inventor: Erich Auernhammer, Pommelsbrunn (DE)

(73) Assignee: Siemens Aktiengesellschaft, München (DE)

( * ) Notice: Subject to any disclaimer, the term of this patent is extended or adjusted under 35 U.S.C. 154(b) by 109 days.

(21) Appl. No.: 12/935,998

(22) PCT Filed: Mar. 20, 2009

(86) PCT No.: PCT/EP2009/053320
§ 371 (c)(1),
(2), (4) Date: Oct. 1, 2010

(87) PCT Pub. No.: WO2009/121732
PCT Pub. Date: Oct. 8, 2009

(65) Prior Publication Data
US 2011/0025145 A1    Feb. 3, 2011

(30) Foreign Application Priority Data
Apr. 1, 2008 (DE) .................... 10 2008 016 946

(51) Int. Cl.
*H02K 41/02* (2006.01)

(52) U.S. Cl. .......................................... 310/54; 310/58
(58) Field of Classification Search .................. 310/52, 310/54, 58, 59, 64, 12.29
See application file for complete search history.

(56) References Cited

U.S. PATENT DOCUMENTS

| | | | | |
|---|---|---|---|---|
| 1,700,840 A | * | 2/1929 | Gay | 310/52 |
| 2,975,309 A | * | 3/1961 | Seidner | 310/54 |
| 3,636,186 A | | 1/1972 | Sturley | |
| 3,715,610 A | * | 2/1973 | Brinkman | 310/54 |
| 3,801,843 A | * | 4/1974 | Corman et al. | 310/52 |
| 3,877,518 A | | 4/1975 | Dreksler | |
| 3,963,950 A | * | 6/1976 | Watanabe et al. | 310/54 |
| 4,172,496 A | | 10/1979 | Melnyk | |
| 4,322,646 A | * | 3/1982 | Persson | 310/64 |
| 4,691,131 A | | 9/1987 | Nakano | |
| 7,309,931 B2 | * | 12/2007 | Hoppe | 310/12.29 |
| 2007/0024132 A1 | | 2/2007 | Bagepalli | |

FOREIGN PATENT DOCUMENTS

| | | |
|---|---|---|
| CN | 2907043 Y | 5/2007 |
| CN | 101132137 | 2/2008 |
| DE | 11 46 970 B | 4/1963 |
| DE | 4107399 A1 | 9/1992 |

(Continued)

*Primary Examiner* — Dang Le
(74) *Attorney, Agent, or Firm* — Henry M. Feiereisen, LLC

(57) ABSTRACT

The mounting of a coolant line system in a magnet device of an electric machine is to be simplified. Therefore, a magnet device is provided, with a ferromagnetic base member (4) comprising a first (3) and an opposite second side (5) and comprising penetration holes for coolant lines from the first side (3) to the second side (5), and a plurality of first coolant line segments (1) inserted through the holes. The first coolant line segments (1) are U-shaped and each of the free leg ends (2) thereof is inserted through two of the holes of the first side (3) such that the leg ends (2) protrude from the second side (5) of the base member (4). Two of the leg ends of the first coolant line segments (1) are connected by way of a second coolant line segment. Thus, only two types of coolant line segments are needed to construct the coolant line system, and also the coolant line segments can be connected at a single side (5) of the base member (4).

5 Claims, 1 Drawing Sheet

FOREIGN PATENT DOCUMENTS

| | | |
|---|---:|---|
| DE | 29717128 U1 | 11/1997 |
| DE | 197 57 605 A1 | 6/1999 |
| DE | 100 27 246 C1 | 10/2001 |
| DE | 10 2005 002 897 A1 | 11/2005 |
| EP | 1 630 930 A2 | 3/2006 |
| JP | 47 018006 U | 10/1972 |
| JP | 51 027219 A | 3/1976 |
| JP | 57 052762 A | 3/1982 |
| JP | 58 063047 A | 4/1983 |
| JP | 58 159850 U | 10/1983 |
| JP | 61 149940 U | 9/1986 |
| JP | 2002 058182 A | 2/2002 |
| JP | 2003 230253 A | 8/2003 |
| JP | 2005 143269 A | 6/2005 |

* cited by examiner

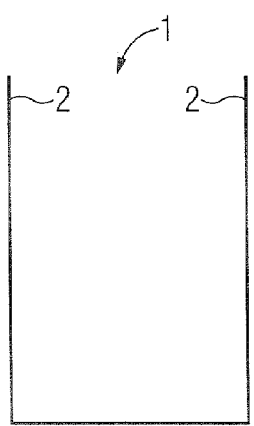
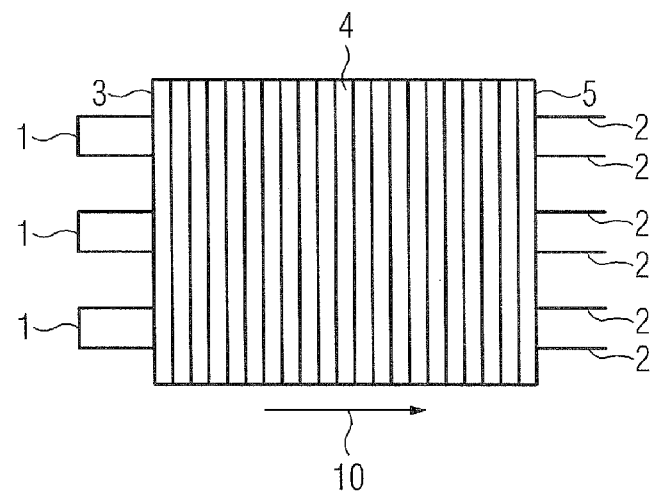
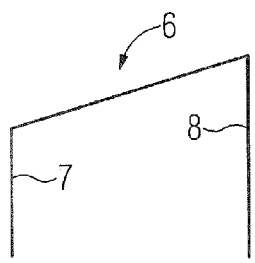
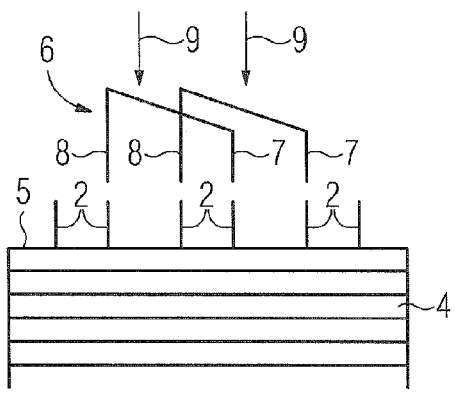
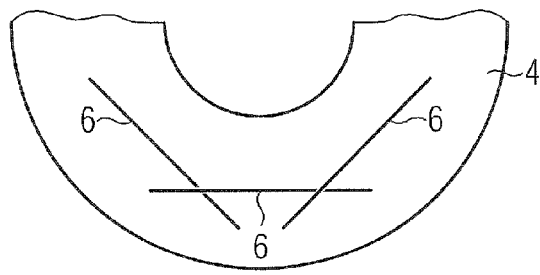

MAGNET APPARATUS OF AN ELECTRICAL MACHINE WITH A COOLANT LINE

CROSS-REFERENCES TO RELATED APPLICATIONS

This application is the U.S. National Stage of International Application No. PCT/EP2009/053320, filed Mar. 20, 2009, which designated the United States and has been published as International Publication No. WO 2009/121732 and which claims the priority of German Patent Application, Serial No. 10 2008 016 946.3, filed Apr. 1, 2008, pursuant to 35 U.S.C. 119(a)-(d).

BACKGROUND OF THE INVENTION

The present invention relates to a magnet apparatus of an electrical machine having a ferromagnetic base body which has a first side and an opposite second side and has continuous channels, for example bores, for coolant lines from the first side to the second side, and a plurality of first coolant line pieces which are plugged through the channels. The electrical machine may be an electric motor, a generator or a transformer.

The coolant line system of an electrical machine, in particular that of a stator of an electric motor, may consist of a plurality of tubular line pieces. This plurality of line pieces generally have different geometric shapes and are connected to one another to form a closed line. The connecting points are located at different positions in the magnet apparatus. For example, connecting points such as these are arranged on the end faces of a stator.

A large number of coolant line pieces leads to a high level of logistic complexity, to a high risk of confusion in respect of the correct connections or the correct line piece during assembly and repair. In particular, in practice, the multiplicity of different lines in some circumstances leads to incorrect assembly, because of the high risk of confusion.

A further problem is that the connecting points or interfaces of the coolant line pieces are provided on both sides of the ferromagnetic base body of the electrical machine (for example stator end faces), and both sides of the base body must therefore be accessible during assembly and during repair. By way of example, this means that the motor or the laminated core must be rotated, or requires assembly from both sides.

It is likewise problematic to locate a leak in the coolant system, which is formed from numerous coolant line pieces. The interfaces are then located at a very large number of different points which have to be investigated and must be freely accessible.

SUMMARY OF THE INVENTION

The object of the present invention is therefore to provide a magnet apparatus for an electrical machine, whose coolant line system is designed to be assembly- and repair-friendly.

According to the invention, this object is achieved by a magnet apparatus of an electrical machine having a ferromagnetic base body which has a first side and an opposite second side and has continuous channels for coolant lines from the first side to the second side, and a plurality of first coolant line pieces which are plugged through the channels, wherein the first coolant line pieces are U-shaped and each of their free limb ends is plugged through two of the channels from the first side such that their limb ends project out of the second side of the base body, and two of the limb ends of the first coolant line pieces are in each case connected by means of a second coolant line piece.

The magnet apparatus according to the invention advantageously makes it possible to provide the interfaces of the individual coolant line pieces only on a single side of a ferromagnetic base body of the electrical machine. This makes it possible to avoid having to rotate the base body, or to carry out assembly on both sides of the base body, during the manufacture of the electrical machine. Furthermore, when interfaces of the coolant line pieces are being repaired, only one side of the electrical machine need be accessible.

The base body of the electrical machine is preferably a laminated core manufactured from electrical steel laminates. The channels or bores then generally run in the stack direction, and the coolant line pieces can be connected to one another on one end face of the laminated core.

By way of example, the base body may be a stator of an electric motor or generator. Furthermore, it may also form the core of a transformer. In any case, the solution according to the invention results in an assembly advantage.

According to one special embodiment, the second coolant line piece may be U-shaped. The limbs of this U-shaped piece are then advantageously a predetermined distance apart, thus allowing them to be plugged onto corresponding limb ends of the first coolant line pieces without much effort.

It is particularly advantageous if the two limbs of the U-shaped second coolant line piece have different lengths to one another. In particular, this makes it possible to produce the constellation such that the second coolant line piece approximately forms a trapezoid with the second side of the base body. This specific shape of the second coolant piece leads to numerous advantages. For example, in particular, this makes it possible to shorten the physical length of a stator, since the coolant line sections can be arranged one on top of the other, in the form of a cascade. A further advantage of the limbs of the second coolant line piece having different lengths is, inter alia, that the fitting of this coolant line piece automatically predetermines the position of further coolant line pieces of the same shape. Specifically, this is the case when a further second coolant line piece runs between the second coolant line piece and the second side of the base body, in order likewise to connect limb ends of first coolant line pieces.

BRIEF DESCRIPTION OF THE DRAWING

The present invention will now be explained in more detail with reference to the attached drawings, in which:

FIG. 1 shows a U-shaped first coolant line piece;

FIG. 2 shows a plurality of first coolant line pieces inserted into a stator of an electrical machine;

FIG. 3 shows a second coolant line piece with different limb lengths;

FIG. 4 shows a sketch of the fitting of second coolant line pieces as shown in FIG. 3 to the limb ends of first coolant line pieces as shown in FIG. 2, and FIG. 5 shows a plan view of a part of the laminated stator core shown in FIG. 4.

DETAILED DESCRIPTION OF PREFERRED EMBODIMENTS

The exemplary embodiment described in more detail in the following text represents one preferred embodiment of the present invention.

FIG. 1 shows a U-shaped first coolant line piece 1 which has two parallel limbs of equal length, which each have a free limb end 2.

A plurality of such first coolant line pieces 1 are pushed, as shown in FIG. 2, from a side 3 of a laminated stator core 4 into corresponding bores (in general: channels) in this laminated stator core 4. The insertion direction of these first coolant line pieces is indicated by an arrow 10 in FIG. 2. The limbs of all the first coolant line pieces 1 are sufficiently long that their limb ends 2 project out of the second side 5 of the laminated stator core 4, which is opposite the first side 3. Nothing but identical first coolant line pieces 1 are therefore inserted from one side 3 into all the cooling bores in the ferromagnetic base body, in this case the laminated stator core 4.

U-shaped second coolant line pieces 6, as shown in FIG. 3, are likewise inserted for connection of the free limb ends 2. A second coolant line piece such as this has two parallel limbs: a short limb 7 and a long limb 8. These two coolant line pieces are now used as shown in FIG. 4 to connect the first coolant line pieces 1 to form a single closed tube. For this purpose, the second coolant line pieces 6 are fitted to the limb ends 2 of the first coolant line pieces 1 and the second side 5 of the laminated stator core 4. No further assembly is required on the first side 3 of the laminated stator core 4. The second coolant line pieces 6 are in this example for this purpose fitted to the limb ends 2 as indicated by the arrows 9 in FIG. 4.

The coolant line sections which project from the side 5 of the laminated stator core 4 in each case approximately form a trapezoid together with the side 5. They can thus be physically interleaved in one another. A coolant line section which is low with respect to the side 5 can thus always run under a higher coolant line section. This results approximately in the view illustrated in FIG. 5, in the plan view of the laminated stator core. The second coolant line piece 6, which is shown on the right in FIG. 5, accordingly runs with its high part over the low part of the second coolant line piece 6, which is shown in the center. This in turn runs with its higher part above the lower part of the second coolant line piece 6 which is shown on the left. The axial physical length of a motor or generator can be reduced by these coolant line pieces which are arranged one on top of the other in the form of a cascade. The physical interleaving of the coolant line sections as a result of the inclines in principle makes it possible to reduce the physical size, for example, of transformers as well.

One essential feature of the present invention is the small number of different parts required for the coolant line system, as well as the capability for simple assembly. At most, connecting components are still required in order to connect the ends of the cooling pipe system to a cooling system on the side 5 on which the second coolant line pieces 6 are also fitted. Therefore, overall, this reduces the variance of the lines to a major extent, in comparison to conventional systems. In the specific case, only two different line types, specifically first coolant line pieces 1 and second coolant line pieces 6, are required.

Because of the small number of types of line pieces and their considerably different type, this virtually precludes incorrect assembly when the lines are inserted into the base body or stator. Furthermore, incorrect assembly of the connecting lines (in this case second coolant line pieces 6) is precluded by the different limb length, when a first connecting line 6 has been fitted and the other connecting lines 6 are intended to engage in one another.

A further advantage which has already been mentioned above is that only one motor side or one side of the electrical machine need be accessible for assembly, fault location and repair. The interfaces between the coolant line pieces are, furthermore, all located on one level, which further enhances the advantages that have been mentioned.

The invention claimed is:

1. A magnet apparatus of an electrical machine, comprising:
   a ferromagnetic base body having first and second sides in opposite relation and including continuous channels extending from the first side to the second side; and
   a plurality of first coolant line pieces extending through the channels and having a U-shaped configuration, each said first coolant line piece having free limb ends extending through two of the channels from the first side such that the limb ends project out of the second side of the base body;
   wherein two of the limb ends of the first coolant line pieces are respectively connected by a second coolant line piece which approximately forms a trapezoid with the second side of the base body, and
   wherein at least a further one of the second coolant line pieces extends between the second coolant line piece and the second side of the base body to connect limb ends of first coolant line pieces.

2. The magnet apparatus of claim 1, wherein the base body is a laminated core manufactured from electrical steel laminates.

3. The magnet apparatus of claim 1, wherein the base body is a stator of an electric motor or generator.

4. The magnet apparatus of claim 1, wherein the second coolant line piece is U-shaped.

5. The magnet apparatus of claim 4, wherein the two limbs of the U-shaped second coolant line piece have different lengths.

* * * * *